(12) United States Patent
Esposito

(10) Patent No.: US 9,305,068 B1
(45) Date of Patent: Apr. 5, 2016

(54) METHODS AND APPARATUS FOR DATABASE VIRTUALIZATION

(71) Applicant: Jeffrey Daniel Esposito, North Kingstown, RI (US)

(72) Inventor: Jeffrey Daniel Esposito, North Kingstown, RI (US)

(73) Assignee: EMC Corporation, Hopkinton, MA (US)

( * ) Notice: Subject to any disclaimer, the term of this patent is extended or adjusted under 35 U.S.C. 154(b) by 616 days.

(21) Appl. No.: 13/630,275

(22) Filed: Sep. 28, 2012

(51) Int. Cl.
*G06F 17/30* (2006.01)

(52) U.S. Cl.
CPC .............................. *G06F 17/30566* (2013.01)

(58) Field of Classification Search
None
See application file for complete search history.

(56) References Cited

U.S. PATENT DOCUMENTS

| | | | | |
|---|---|---|---|---|
| 5,642,496 A * | 6/1997 | Kanfi | ............................. | 711/162 |
| 7,010,546 B1 * | 3/2006 | Kolawa et al. | ................. | 707/694 |
| 8,341,648 B1 * | 12/2012 | Cook | ............................. | 719/318 |
| 8,516,191 B2 * | 8/2013 | Matsuki et al. | ............... | 711/114 |
| 8,560,671 B1 * | 10/2013 | Yahalom et al. | .............. | 709/224 |
| 2009/0164991 A1 * | 6/2009 | Takashige et al. | ................ | 718/1 |
| 2011/0106949 A1 * | 5/2011 | Patel et al. | ..................... | 709/226 |
| 2011/0276684 A1 * | 11/2011 | Singh et al. | .................... | 709/224 |
| 2011/0302294 A1 * | 12/2011 | Oostlander et al. | ... | G06F 11/302 709/224 |
| 2011/0307889 A1 * | 12/2011 | Moriki et al. | ..................... | 718/1 |
| 2011/0320540 A1 * | 12/2011 | Oostlander et al. | . | G06F 11/3006 709/206 |
| 2012/0245897 A1 * | 9/2012 | Bose et al. | .................... | 702/186 |
| 2013/0086583 A1 * | 4/2013 | Uemura et al. | ................... | 718/1 |
| 2013/0304899 A1 * | 11/2013 | Winkler | ....................... | 709/224 |

* cited by examiner

*Primary Examiner* — Richard Bowen
(74) *Attorney, Agent, or Firm* — Ryan, Mason & Lewis, LLP

(57) ABSTRACT

Methods and apparatus are provided for database virtualization. A virtualized database is designed by receiving a user selection of one or more existing databases for virtualization; receiving a user selection of a target virtualization platform host profile for the virtualized database; receiving a user selection of a target virtualization storage profile for the virtualized database; and providing the user with a comparison of an actual performance of the selected existing database and a projected performance of the existing database on the selected target virtualization platform host. A user can specify a backup and recovery profile for the virtualized database. Metadata affinity can optionally be analyzed for a plurality of the selected existing databases to identify an affinity correlation across the selected existing databases. Templates and/or configuration files can be generated for the selected target virtualization environment (optionally based on rule-based best practices).

26 Claims, 7 Drawing Sheets

METHODS AND APPARATUS FOR DATABASE VIRTUALIZATION

FIELD OF THE INVENTION

The present invention relates generally to techniques for database virtualization.

BACKGROUND OF THE INVENTION

Database virtualization aims to consolidate databases on storage devices. Database virtualization decentralizes the database and masks the physical location and configuration of a database from applications. A virtualized database can be stored on a number of computers, in multiple locations and on multiple types of database software.

While virtualization technology has simplified database management and improved the performance, availability, flexibility, efficiency and processing speed of databases, there is currently no means to sample, model, and forecast for database virtualization. Existing physical-to-virtual (P2V) and capacity planner toolsets generate Virtual Machine templates based on generic workload and standardized resource computation resulting in tentative, costly, and error-prone adoption of database virtualization.

A need therefore exists for a database virtualization modeler/wizard that models, forecasts, and generates virtual machine configuration files against monitored databases. Yet another need exists for a database virtualization modeler/wizard that enables interactive and proactive analysis of database virtualization configuration and layout using a combination of gathered performance metrics, embedded and encapsulated best practices, and criteria selection.

SUMMARY OF THE INVENTION

The present invention in the illustrative embodiments described herein provides methods and apparatus for database virtualization. In accordance with an aspect of the invention, a virtualized database is designed by receiving a user selection of one or more existing databases for virtualization; receiving a user selection of a target virtualization platform host profile for the virtualized database; receiving a user selection of a target virtualization storage profile for the virtualized database; and providing the user with a comparison of an actual performance of the selected existing database and a projected performance of the existing database on the selected target virtualization platform host.

According to a further aspect of the invention, a user can also specify a backup and recovery profile for the virtualized database. The user can optionally select the backup and recovery profile for the virtualized database from a list of available backup and recovery profiles. In addition, the user can optionally specify one or more blackout windows when the virtualized database will be unavailable during a backup. The selected backup and recovery profile can be used to determine a network utilization and/or a processor utilization for the backup.

Metadata affinity can optionally be analyzed for a plurality of the selected existing databases to identify an affinity correlation across the selected existing databases.

According to another aspect of the invention, templates and/or configuration files can be generated for the selected target virtualization environment. The template generation can be based on rule-based best practices. In addition, the templates can be optionally stored in a template library for subsequent re-use and modification.

The database virtualization techniques of the illustrative embodiments overcome one or more of the problems associated with the conventional techniques described previously. These and other features and advantages of the present invention will become more readily apparent from the accompanying drawings and the following detailed description.

DETAILED DESCRIPTION

Aspects of the present invention provide a database virtualization modeler/wizard that models, forecasts, and generates virtual machine configuration files against monitored databases. According to one aspect of the invention, the disclosed database virtualization modeler/wizard enables interactive and proactive analysis of database virtualization configuration and layout using a combination of gathered performance metrics, embedded and encapsulated best practices, and criteria selection.

According to further aspects of the invention, the disclosed database virtualization modeler/wizard addresses operational schedule impacts, backup and recovery environment impacts, database performance metrics, database and metadata affinity across database vendors and types and configuration for storage and memory resource alignment to business data priorities.

Figure 1:
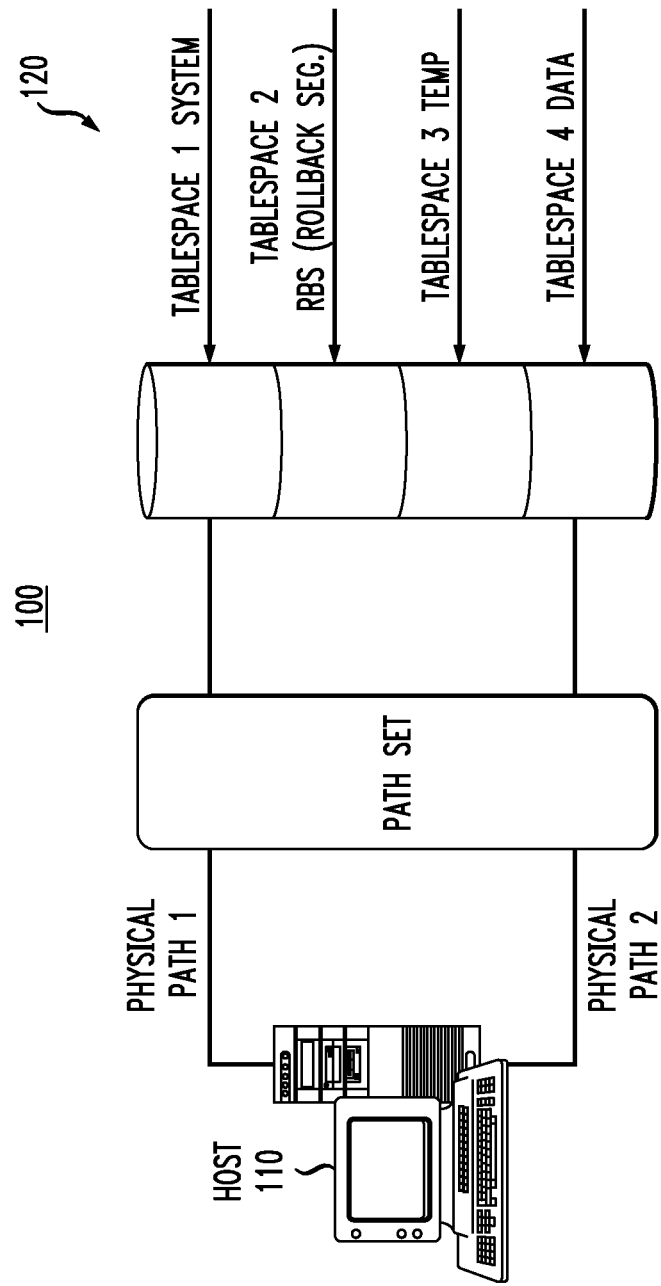
FIG. 1 illustrates an exemplary conventional database environment.

FIG. 1 illustrates an exemplary conventional database environment 100. As shown in FIG. 1, the exemplary conventional database environment 100 comprises a host 110 that accesses a database over a pathset comprised of one or more physical paths. The exemplary database comprises a plurality of tablespaces 1-4 where the actual data underlying the database objects can be stored. The tablespaces provide a layer of abstraction between the physical and logical data.

Figure 2:
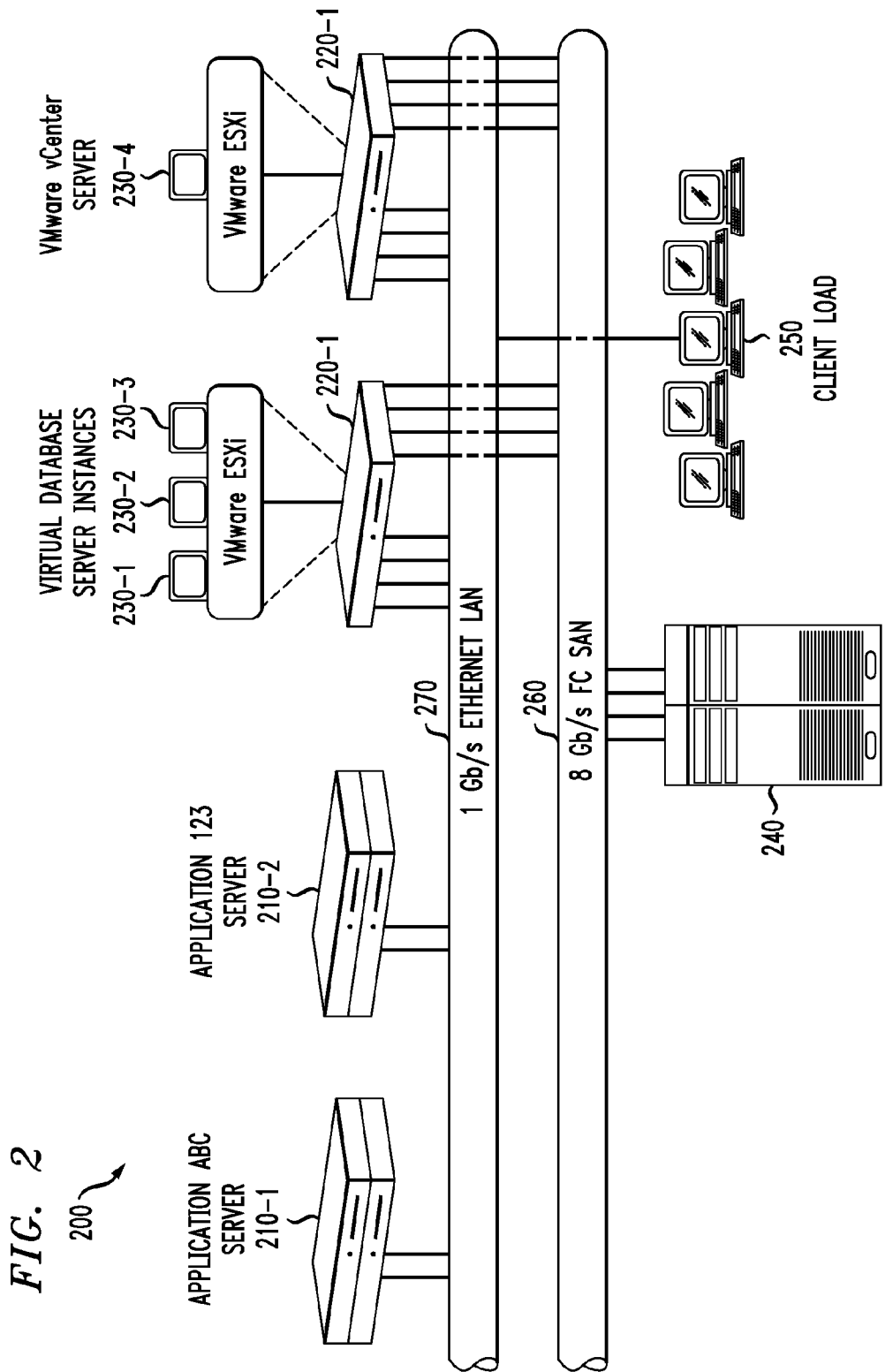
FIG. 2 illustrates an exemplary virtualized database environment in accordance with aspects of the present invention.

FIG. 2 illustrates an exemplary virtualized database environment 200 in accordance with aspects of the present invention. As shown in FIG. 2, the exemplary virtualized database environment 200 comprises one or more application servers 210, one or more virtualization servers 220, one or more virtual database instances 230, one or more enterprise storage arrays 240 and a client load 250. The various entities 210, 220, 230, 240, 250 communicate over one or more of a storage area network (SAN) 260 and a local area network (LAN) 270.

In the exemplary embodiment 200 of FIG. 2, the virtualization servers 220 manage the virtual database instances 230 and are embodied as VMWare ESXi™ from VMWare Inc.

The exemplary enterprise storage arrays 240 can be embodied, for example, as a Symmetrix® VMAX® commercially available from EMC Corp.

Aspects of the present invention provide a database virtualization process 300, discussed further below in conjunction with FIG. 3, and a database virtualization engine 600, discussed further below in conjunction with FIG. 6, that can be employed to consolidate, model and configure virtualized databases 230 within the virtualized database environment 200. The database virtualization process 300 and database virtualization engine 600 forecast and confirm design and operational elements for database virtualization. As discussed hereinafter, the exemplary database virtualization process 300 and database virtualization engine 600 simplifies the complexities of right sizing, right tiering and correct consolidation of databases.

Figure 3:
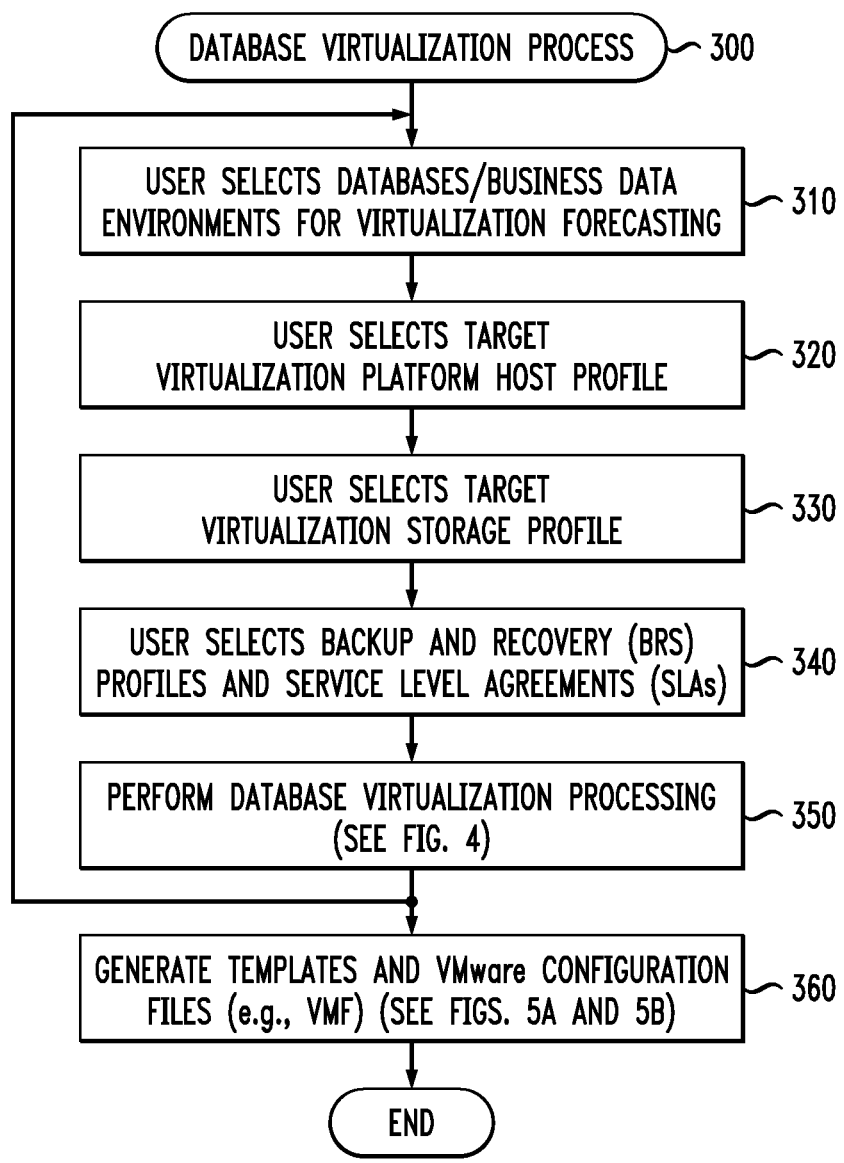
FIG. 3 is a flow chart describing an exemplary implementation of a database virtualization process incorporating aspects of the present invention.

FIG. 3 is a flow chart describing an exemplary implementation of a database virtualization process 300 incorporating aspects of the present invention. As shown in FIG. 3, the exemplary database virtualization process 300 initially guides a user through selection of one or more databases and business data environments for virtualization forecasting during step 310. For example, the user can be presented with a list of the existing actual databases of the enterprise for selection. The list of the existing actual databases can optionally present associated performance metrics and/or additional information for each identified database. For example, the presented performance metrics can include, for example, a score or a health assessment, such as a Green/Yellow/Red indicator based on predefined performance thresholds. In addition, a user can be provided with a Go/No Go dashboard view with reasoned messaging. In this manner, root causes of potential consolidation impacts can be identified, in advance of implementation.

Thereafter, the user selects a target virtualization platform host profile during step 320. For example, the user can be presented with a list of available virtualization hosts for selection. As indicated above, in the exemplary embodiment 200 of FIG. 2, the virtualization servers 220 are embodied as VMWare ESXi™. Thus, the user can be presented with a list of available VMWare ESXi™ host profiles, optionally with the processing speed, memory capacity and network adapter capacity of each available VMWare® server. As discussed hereinafter, the selected virtualization platform host becomes the comparison profile against which the performance metrics of the actual database can be compared.

During step 330, the user selects the target virtualization storage profile (i.e., the actual storage system). For example, the user can be presented with a list of available virtualization storage profiles for selection. As indicated above, in the exemplary embodiment 200 of FIG. 2, the exemplary enterprise storage arrays 240 can be embodied, for example, as a Symmetrix® VMAX® commercially available from EMC Corp. In addition, the user could select from among one or more Symmetrix® VNX® storage arrays commercially available from EMC Corp. Thus, the user can be presented with a list of available virtualization storage profiles, optionally with the model information and/or associated performance specifications of each available storage option. In one exemplary embodiment, existing in-place storage of the enterprise can be a default selection.

The user selects backup and recovery (BRS) profiles and service level agreements (SLAs) during step 340. For example, the user can be presented with one or more target-based de-duplication options (with a greater burden on the network, affecting the network weighting below), such as data domain model options, and/or one or more source-based de-duplication options (with a greater burden on the host affecting the CPU weighting below), such as Avamar options to backup the VMWare® environment. In addition, during step 340, the user can also specify the acceptable blackout windows when the database will be unavailable during backup.

As discussed further below in conjunction with FIG. 4, the database virtualization process 300 performs database virtualization processing during step 350 and presents the results to the user. For example, the database virtualization process 300 can indicate to the user whether the selected database virtualization candidates will work in the selected target environment. The user can also optionally click on failing database virtualization candidates to see any incompatibility (e.g., too memory/CPU intensive for selected host; or backup window mismatch). In this manner, the user can select a failing database virtualization candidate and correct any problems.

Figure 5A:
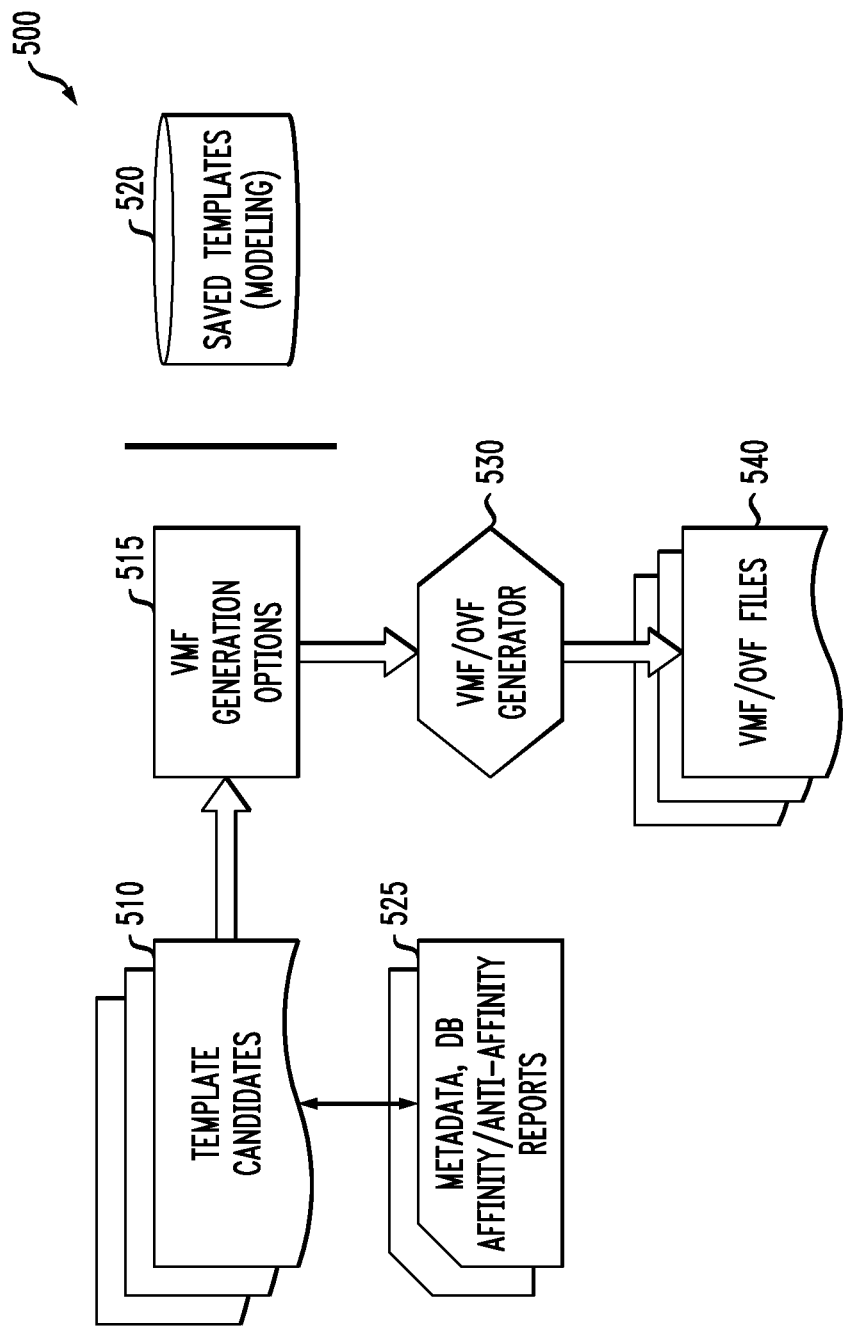
FIG. 5A is a flow chart illustrating an exemplary template and configuration generation process that incorporates aspects of the present invention.

As discussed further below in conjunction with FIGS. 5A and 5B, the database virtualization process 300 generates templates and VMWare® configuration files (e.g., VMF files) during step 360. For example, the user can optionally click on passing database virtualization candidates presented during step 350 to generate template files.

Figure 4:
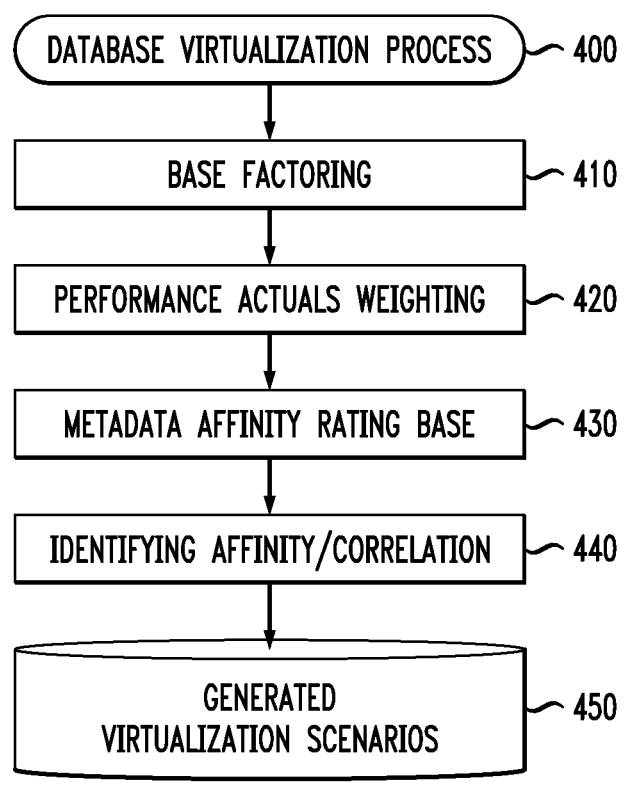
FIG. 4 is a flow chart describing an exemplary implementation of a database virtualization background process incorporating aspects of the present invention.

FIG. 4 is a flow chart describing an exemplary implementation of a database virtualization background process 400 incorporating aspects of the present invention. As indicated above, the database virtualization background process 400 is executed during step 350 of the database virtualization process 300. The exemplary database virtualization background process 400 optionally performs a hash check prior to executing to identify invalid and/or unsupported combinations of user selections during steps 310, 320, 330 and 340 of FIG. 3. If an invalid combination is detected, the database virtualization background process 400 can provide a notification to the user and stop execution. In addition, the database virtualization background process 400 determines a complexity rating for the target technology based on a degree of partial match. For example, a BRS Source de-duplication with high CPU consumption sets the BRS a rank to 7 out of ten.

As shown in FIG. 4, the exemplary database virtualization background process 400 then performs base factoring during step 410. Generally, the base factoring performed during step 410 retrieves and interprets all core virtualization infrastructure (VI) factoring criteria and assigns a quantitative score. In this manner, a quantitative weighting and a correct virtualization infrastructure technology mix can be assigned.

For example, during step 410, an integer factor assignment can be based on the following performance metrics for selected environment:

Storage Size, Type, and complexity rating;
Monitored activity volume;
Peak input/output operations (IOPS) by monitored storage device for database; and
Selected Storage, BRS and Virtualization options.

An exemplary quantitative weighting can be expressed as follows:

$X$=assigned Target Technology complexity rating $A$=(Size category value+$X$)(Storage Type value+$X$)

$B$=(Monitored Activity volume(System Metric variable−$v$$sysmetric))

$C$=(Peak IOPS value+Growth %)

$D$=(BRS rank(BRS product value))

Base Virtualization Factoring=$A+B+C+D$. (1)

As shown in FIG. 4, the exemplary database virtualization background process 400 weights the actual monitored performance values during step 420, and a correct virtualization infrastructure technology combination can be identified.

Weight values for the performance metrics can be expressed as follows:
- Network Utilization (IO Statistics variable–v$IOStat_Network)
- Host CPU Detailing (System Global Area Information variable–v$SGAINFO (size, granule size, free memory), system global area dynamic memory variable–v$SGA_Dynamic*)
- Disk I/O profiling based on Storage Tier Activity (v$sysmetric).

The correct virtualization infrastructure technology combination is then selected based on:
Base Virtualization Factoring+Weight Value identified The exemplary database virtualization background process 400 computes a metadata affinity rating for a base during step 430, and top metadata detailing is performed and cataloged.

An exemplary metadata base type rank can be computed as follows:

$$E = (\text{Type of DB})$$

$$F = (\text{DB Vendor, Version})$$

$$G = (\text{Current Monitored database status value(Red, Yellow, Green)})$$

$$\text{Metadata Base type rank} = (E+F+G) \quad (2)$$

In this manner, an affinity of metadata between at least two databases selected during step 310 (FIG. 3) can be ranked during step 430 based on the calculated metadata base type rank value. The top five data structure elements from the selected databases can then be identified based on monitored business filters.

The exemplary database virtualization background process 400 then identifies correlation of virtualization infrastructure affinity across selected databases during step 440. Metadata affinity rank and detailing can be compared and then the database virtualization infrastructure profile array is update updated to link affinitied databases.

Finally, the exemplary database virtualization background process 400 generates scenario findings during step 450. The findings can be posted to a repository for persistence and to the graphical user interface (GUI) for user review and interactive investigation.

As indicated above, the database virtualization process 300 generates templates and VMWare® configuration files (e.g., VMF files) during step 360. FIG. 5A is a flow chart illustrating an exemplary template and configuration generation process 500 that incorporates aspects of the present invention. The user can optionally click on passing database virtualization candidates presented during step 350 to generate candidate template files 510. The user can select a template and specify options during step 515 to generate configuration files 540, such as VMF files, during step 530 using saved templates 520. The exemplary template and configuration generation process 500 employs encapsulated best practices that can be tempered by the monitored state of customer environment.

Figure 5B:
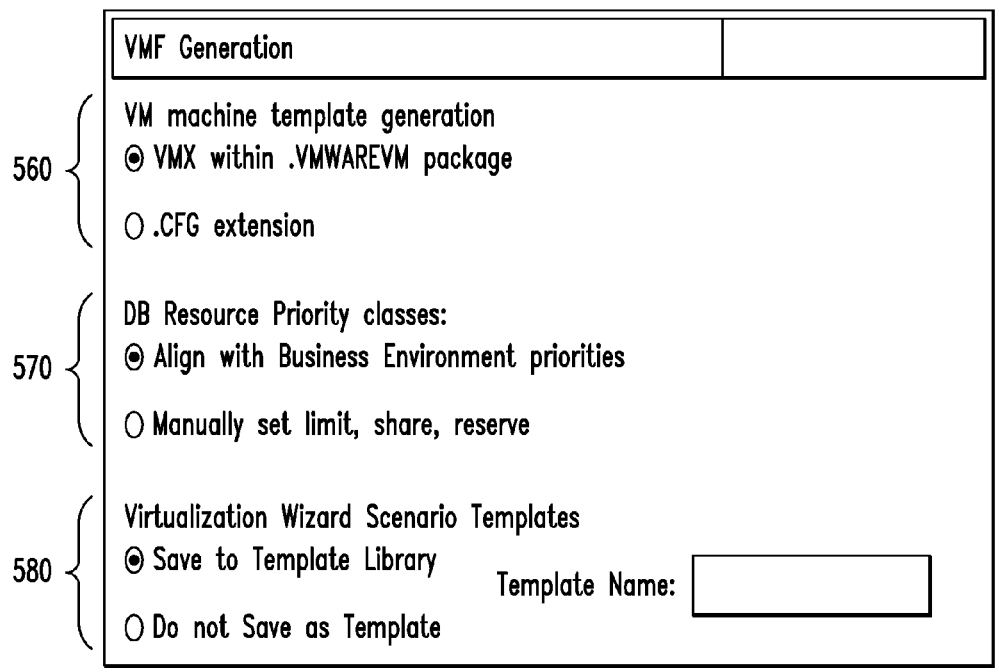
FIG. 5B illustrates an exemplary configuration file interface.

FIG. 5B illustrates an exemplary VMF configuration interface 550. The user can specify the desired virtual machine template in section 560, a desired database priority class in section 570 and whether a virtualization wizard scenario template should be saved in section 580.

Figure 6:
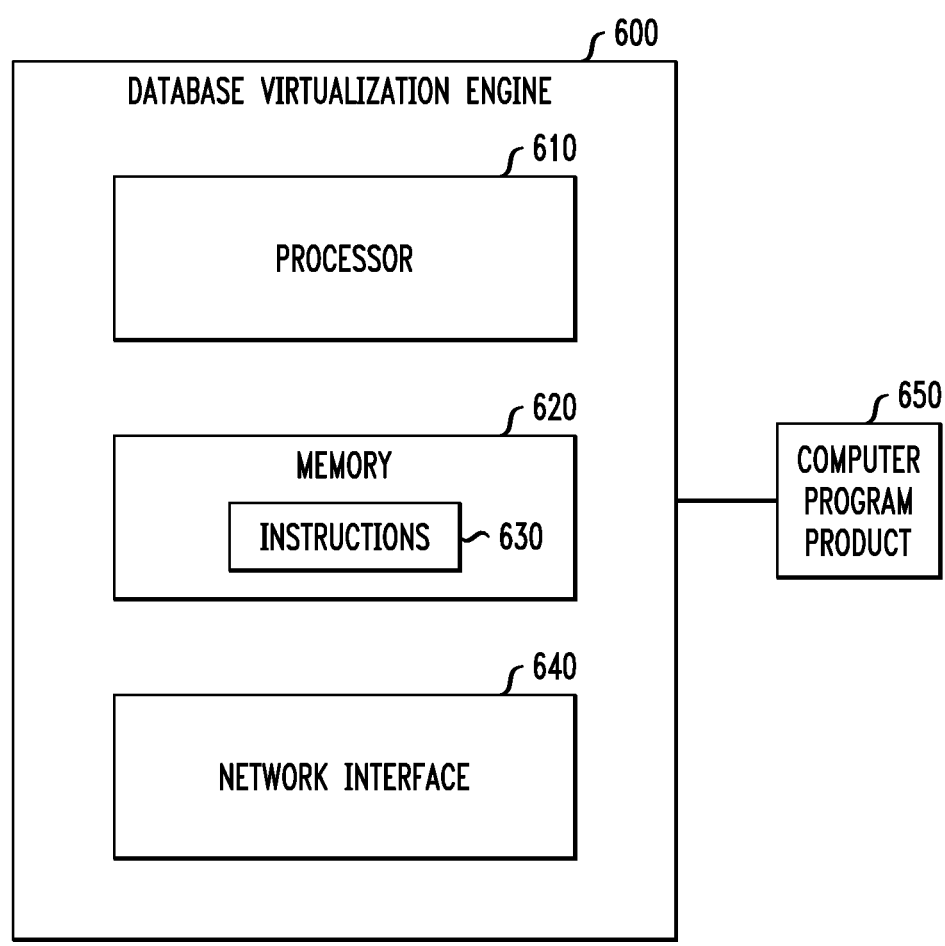
FIG. 6 is a schematic diagram illustrating an exemplary database virtualization engine.

FIG. 6 is a schematic diagram illustrating an exemplary database virtualization engine 600. The exemplary database virtualization engine 600 includes a processor 610, a memory 620 and a network interface 640.

Memory 620 is configured to store data and code which includes instructions 630 to process the database virtualization process 300 of FIG. 3. Memory 620 generally takes the form of, e.g., random access memory, flash memory or a non-volatile memory.

Processor 610 can take the form of, but is not limited to, an Intel or AMD-based MPU, and can be a single or multi-core running single or multiple threads. Processor 610 is coupled to memory 620 and is configured to execute the instructions 630 stored in memory 620.

Network interface 640 is constructed and arranged to send and receive data over a communications medium. A computer program product 650 may optionally store additional instructions.

As mentioned previously herein, the above-described embodiments of the invention are presented by way of illustrative example only. Numerous variations and other alternative embodiments may be used. For example, while the exemplary embodiment employs VMWare® virtualization servers and virtual database instances, other specifications and data formats can be employed.

The illustrative embodiments of the invention as described herein provide improved methods and systems for database virtualization. It should again be emphasized that the particular embodiments described above are provided by way of illustration, and should not be construed as limiting the present invention to any specific embodiment or group of embodiments. For example, as previously noted, the described embodiments may be adapted in a straightforward manner to operate with other types of virtualization standards and specifications. Also, the particular configuration of system elements shown in FIGS. 2 and 6, and their interactions as shown in FIGS. 3, 4 and 5A, may be varied in other embodiments. Moreover, the various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

What is claimed is:

1. A method, comprising:
    receiving a user selection of at least one existing non-virtualized database to be converted to a virtualized database;
    receiving a user selection of a profile for a target virtualization platform host for said virtualized database;
    receiving a user selection of a profile for a target virtualization storage environment for said virtualized database;
    determining a base virtualization factor based on one or more performance metrics of said selected existing non-virtualized database and one or more projected performance metrics of said existing non-virtualized database on said selected target virtualization platform host and said selected target virtualization storage environment as a virtualized component of a business data environment; and
    selecting a predefined combination of said target virtualization platform host and said selected target virtualization storage environment based on said determined base virtualization factor.

2. The method of claim 1, further comprising the step of receiving a user selection of a backup and recovery profile for said virtualized database.

3. The method of claim 2, wherein said step of receiving said user selection of said backup and recovery profile for said virtualized database further comprises the step of presenting said user with a list of available backup and recovery profiles.

4. The method of claim 2, wherein said step of receiving said user selection of said backup and recovery profile for said virtualized database further comprises the step of receiving a user specification of one or more blackout windows when said virtualized database will be unavailable during backup.

5. The method of claim 2, further comprising the step of determining one or more of a network utilization and a processor utilization for said selected backup and recovery profile.

6. The method of claim 1, further comprising the step of analyzing a ranking of an affinity of metadata between at least two of said selected existing non-virtualized databases, wherein said metadata describes one or more aspects of data in said existing non-virtualized database.

7. The method of claim 6, further comprising the step of identifying an affinity correlation across at least two of said selected existing non-virtualized databases to link said selected existing non-virtualized databases satisfying an affinity criteria.

8. The method of claim 1, further comprising the step of presenting said user with scenario results for a selected target virtualization environment.

9. The method of claim 1, further comprising the step of generating one or more virtual machine templates for one or more of said selected target virtualization platform host and said selected target virtualization storage environment.

10. The method of claim 9, wherein said step of generating one or more virtual machine templates is guided by one or more rule-based best practices.

11. The method of claim 9, further comprising the step of storing one or more of said virtual machine templates in a template library.

12. The method of claim 1, further comprising the step of generating one or more configuration files for one or more of said selected target virtualization platform host and said selected target virtualization storage environment.

13. The method of claim 1, wherein said step of receiving said user selection of at least one existing non-virtualized database to be converted to said virtualized database further comprises the step of presenting said user with a list of existing non-virtualized databases for selection.

14. The method of claim 1, wherein said step of receiving said user selection of at least one existing non-virtualized database to be converted to said virtualized database further comprises the step of presenting performance metrics for one or more existing non-virtualized database.

15. The method of claim 1, wherein said step of receiving said user selection of said profile of said target virtualization platform host further comprises the step of presenting said user with a list of available virtualization hosts.

16. The method of claim 1, wherein said step of receiving said user selection of said profile of said target virtualization platform host further comprises the step of presenting said user with specifications for one or more available virtualization hosts.

17. The method of claim 1, wherein said step of receiving said user selection of said profile of said target virtualization storage environment further comprises the step of presenting said user with a list of available virtualization storage profiles.

18. A tangible machine-readable recordable storage medium, wherein one or more software programs when executed by one or more processing devices implement the steps of the method of claim 1.

19. A system, the system comprising:
a memory; and
at least one hardware device, coupled to the memory, operative to implement the following steps:
receive a user selection of at least one existing non-virtualized database to be converted to a virtualized database;
receive a user selection of a profile for a target virtualization platform host for said virtualized database;
receive a user selection of a profile for a target virtualization storage environment for said virtualized database;
determine a base virtualization factor based on one or more performance metrics of said selected existing non-virtualized database and one or more projected performance metrics of said existing non-virtualized database on said selected target virtualization platform host and said selected target virtualization storage environment as a virtualized component of a business data environment; and
select a predefined combination of said target virtualization platform host and said selected target virtualization storage environment based on said determined base virtualization factor.

20. The system of claim 19, wherein said at least one hardware device is further configured to receive a user selection of a backup and recovery profile for said virtualized database.

21. The system of claim 19, wherein said at least one hardware device is further configured to analyze a ranking of an affinity of metadata between at least two of said selected existing non-virtualized databases, wherein said metadata describes one or more aspects of data in said existing non-virtualized database.

22. The system of claim 21, wherein said at least one hardware device is further configured to identify an affinity correlation across at least two of said selected existing non-virtualized databases to link said selected existing non-virtualized databases satisfying an affinity criteria.

23. The system of claim 19, wherein said at least one hardware device is further configured to generate one or more virtual machine templates for one or more of said selected target virtualization platform host and said selected target virtualization storage environment.

24. The system of claim 23, wherein said one or more virtual machine templates are generated based on one or more rule-based best practices.

25. The system of claim 19, wherein said at least one hardware device is further configured to generate one or more configuration files for one or more of said selected target virtualization platform host and said selected target virtualization storage environment.

26. The system of claim 19, wherein said at least one hardware device is further configured to present performance metrics for one or more existing non-virtualized databases.

* * * * *